(12) United States Patent
Howard

(10) Patent No.: US 9,931,932 B2
(45) Date of Patent: Apr. 3, 2018

(54) SYSTEM, METHOD, AND DEVICE FOR WIRELESS CONTROL OF A VEHICLE'S POWER SUPPLY

(71) Applicant: James Howard, Roseville, CA (US)

(72) Inventor: James Howard, Roseville, CA (US)

(73) Assignee: James Howard, Roseville, CA (US)

( * ) Notice: Subject to any disclaimer, the term of this patent is extended or adjusted under 35 U.S.C. 154(b) by 0 days.

(21) Appl. No.: 15/528,870

(22) PCT Filed: Aug. 16, 2016

(86) PCT No.: PCT/US2016/047171
§ 371 (c)(1),
(2) Date: May 23, 2017

(87) PCT Pub. No.: WO2017/031115
PCT Pub. Date: Feb. 23, 2017

(65) Prior Publication Data
US 2017/0267098 A1 Sep. 21, 2017

Related U.S. Application Data

(60) Provisional application No. 62/205,971, filed on Aug. 17, 2015.

(51) Int. Cl.
| | |
|---|---|
| B60L 1/00 | (2006.01) |
| B60L 3/00 | (2006.01) |
| H02G 3/00 | (2006.01) |
| B60K 31/00 | (2006.01) |
| H04W 84/00 | (2009.01) |

(Continued)

(52) U.S. Cl.
CPC ........ B60K 31/0058 (2013.01); B60R 25/018 (2013.01); B60R 25/102 (2013.01); G01S 3/38 (2013.01); H01H 47/226 (2013.01); H02J 7/1423 (2013.01); H04M 11/007 (2013.01); H04W 84/005 (2013.01); H04W 84/10 (2013.01); H04W 84/18 (2013.01)

(58) Field of Classification Search
CPC . B60K 31/0058; B60R 25/018; B60R 25/102; G01S 3/38; H01H 47/226; H02J 7/1423; H04M 11/007; H04W 84/005; H04W 84/10; H04W 84/18
USPC ........................................................ 307/10.1
See application file for complete search history.

(56) References Cited

U.S. PATENT DOCUMENTS 3,683,239 A 8/1972 Sturman
4,476,825 A 10/1984 Mills
(Continued)

*Primary Examiner* — Carlos Amaya
(74) *Attorney, Agent, or Firm* — Spencer Fane LLP

(57) ABSTRACT

The present invention provides a wireless power-supply control assembly 100 for wirelessly controlling a boat's main power supply. The assembly 100 comprises an enclosure assembly 110, wherein a latching relay 600 and a wireless-receiver relay 300 are mounted. The wireless receiver relay 300 is controlled by commands from a wireless transmitter and causes the latching relay 600 to connect or disconnect the boat's main power. In other embodiments, an ignition-sense relay 400 is also mounted within the enclosure and disconnects power to the wireless-receiver relay 300 when the boats ignition is on. In yet another embodiment, a manual override switch 200 is provided within the enclosure for bypassing the latching relay 600 and manually connecting the boat's power.

16 Claims, 4 Drawing Sheets

(51) Int. Cl.
  *H04W 84/10* (2009.01)
  *B60R 25/102* (2013.01)
  *H04W 84/18* (2009.01)
  *G01S 3/38* (2006.01)
  *H04M 11/00* (2006.01)
  *B60R 25/01* (2013.01)
  *H01H 47/22* (2006.01)
  *H02J 7/14* (2006.01)

(56) References Cited

U.S. PATENT DOCUMENTS

| | | |
|---|---|---|
| 5,886,647 A | 3/1999 | Badger et al. |
| 8,219,269 B2 * | 7/2012 | Ichikawa ............ B63H 21/213 440/85 |
| 2003/0016130 A1 | 1/2003 | Joao |
| 2004/0075342 A1 | 4/2004 | Feldman et al. |
| 2005/0287880 A1 | 12/2005 | Okuyma |
| 2007/0096948 A1 | 5/2007 | La Barbera |
| 2007/0227426 A1 | 10/2007 | Funayose et al. |
| 2008/0030325 A1 | 2/2008 | Fries |

* cited by examiner

SYSTEM, METHOD, AND DEVICE FOR WIRELESS CONTROL OF A VEHICLE'S POWER SUPPLY

CROSS-REFERENCE TO RELATED APPLICATIONS

This application claims priority to U.S. Provisional application No. 62/205,971, filed Aug. 17, 2015, entitled "System, Method, and Device for Wireless Control of a Vehicle's Power Supply," which is herein incorporated by reference in its entirety.

FIELD OF THE INVENTION

The present invention relates generally to power supplies for vehicles. More specifically, the present invention relates to methods and systems for wireless control with manual override capabilities of main power supplies for water vehicles and an enclosure assembly for housing such.

BACKGROUND

Water vehicles, such as boats (also referred to as a vessel), require electrical power to operate various on board systems such as lighting and engine ignition, and electrical power is commonly provided by batteries or banks of batteries. To conserve energy and to make boats safer by reducing fire hazards when they are not in operation (e.g., docked), electrical components called switches (or relays), which can break an electrical circuit thereby interrupting the current or diverting it from one conductor to another, are used to disengage the boats' battery systems from the boats main power or common supply cable when the ignition is turned off and the boat is not being used. The boat's operator or captain will manually turn the switch off (which opens a circuit within the switch) when leaving the boat to prevent any electrical components from draining the battery of the boat. And, the operator will manually turn on the switch (which closes the circuit within the switch) when returning to the boat in order to make the boat operational.

Typically, such a manual battery switch is inconveniently located in a central console or below deck. To operate the manual switches to disengage and reengage the batteries, individuals must actually board the boats, and boarding and moving around a boat to find and operate a relay or switch is inconvenient, especially in the dark. Because the boat's batteries are disconnected, the boat's lighting is not available. For example, when preparing to get under way at night, individuals such as vessel masters must find their way in the dark or bring a flashlight to find and activate the relay or switch.

Accordingly, there is a need for a wireless control system for controlling a boat's power supply, where the wireless control system may be remotely controlled by a wireless transmitter (e.g., by wireless key FOB while an operator is on dock). There is further a need prevent such wireless control being activated while the boat is operational as accidentally disengaging power while the boat is operating as losing power on a boat during operation could be catastrophic. Indeed, the chances of inadvertently activating a wireless remote are increased when individuals are being moved about on boats by rough waters, which is precisely when a loss of power is most dangerous. Still further, there is a need for such a wireless control system to be capable of being conveniently retrofitted with a conventional boat's systems. Still further, there is a need for such a wireless control system to be self-contained and have a compact form factor. Still further, there is a need for such a wireless system to be enclosed in a water tight enclosure to prevent damage from the wet environment. Still further, there is a need for such a wireless system to be manually overridden in event of a malfunction or if its wireless transmitter is lost.

SUMMARY

There is, therefore, provided in the practice of this invention, an apparatus including a wireless control for actuating multiple preset electrical devices on boats without having to board the vessel. The apparatus allows selected systems such as cockpit lights, spreader lights, radios, electronics, power tilt/trims, etc. all to be powered up remotely with the wireless control. To minimize the chances of accidental power loss while the boat is operating, an ignition-sense (or ignition-sensor) feature prevents accidental power disconnection if the wireless transmitter is activated while a boat's engine is running.

A wireless power-supply control assembly is provided. The wireless power-supply control assembly comprises an enclosure comprising a body and a cover, wherein the body and the cover define a hollow cavity. A wireless-receiver relay is mounted to the enclosure within the hollow cavity and is adapted to wirelessly receive a command from a wireless transmitter (such as a wireless key FOB, Bluetooth® device, or a Wi-Fi device). A latching relay is mounted to the enclosure within the hollow cavity and is coupled to the wireless-receiver relay. The latching relay has a line terminal that is adapted to be coupled to a common-supply cable from a boat's battery and a load terminal that is adapted to be coupled to a boat's power main cable. The latching relay has an open and a closed position. The latching relay is adapted to connect power from the line terminal to the load terminal when the latching relay is in the closed position and to disconnected power between the line terminal and the load terminal when the latching relay is in the open position. The wireless-receiver relay is adapted to cause the latching relay to switch between the open and closed positions in response to receiving a wireless command.

In another embodiment, the wireless power-supply control assembly further comprises an ignition-sense relay mounted to the enclosure within the hollow cavity and is coupled to the wireless-receiver relay. The ignition-sense relay is adapted to receive a boat's ignition-sense signal (i.e., indicating whether a boat's engine is on or off) and is adapted to disconnect power to the wireless-receiver relay when the ignition-sense signal indicates that a boat's engine is running. This advantageously prevents power lose if the wireless transmitter is accidently activated while the boat is running.

In yet another embodiment, the wireless power-supply control assembly further comprises an antenna coupled to the wireless-receiver relay. At least a portion of the antenna extends through an opening in the enclosure to the exterior of the enclosure, thereby enhancing range. In other embodiments, the opening for the antenna is sealed.

In yet another embodiment, the wireless power-supply control assembly further comprises a manual override switch mounted to the enclosure. The manual override switch may be in an open position or a closed position. When in the closed position, the manual override switch is adapted to bypass the latching relay and connects power from the common-supply cable directly to the boat's power main cable. When the manual override switch is in the open position, the wireless power-supply control assembly operates normally and the latching relay controls the connection (or disconnection) of power between the common-supply cable and boat's power main cable. In other embodiments, the manual override switch is mounted in an opening in the enclosure and the manual override switch is adapted to be selectably positioned in the open or the closed position from the exterior of the enclosure.

In yet another embodiment, the latching relay is adapted to remain in its current open or closed position if power is disconnected to the wireless-receiver relay. In other embodiments, the latching relay is adapted to remain in its current open or closed without using any power. In other embodiments, the latching relay is a high amperage relay.

In yet another embodiment, the wireless-receiver relay is adapted to consume approximately 10 nano amperes or less of current while listening for a wireless command. In other embodiments, the wireless-receiver relay is a polarity switching circuit and is adapted to consume approximately 0.3 amperes or less of current while switching polarity.

In yet another embodiment, the wireless power-supply control assembly further comprises at least one liquid tight strain relief fitting mounted in an opening in the enclosure and adapted for receiving a common-supply cable. In other embodiments, the hollow interior is adapted to be substantially waterproof when the enclosure is operational (i.e., when the cover is secured to the body, all wiring is properly installed and sealed, etc.).

In still yet another embodiment, a water vehicle is provided. The water vehicle comprises a hull, gunnel, steering mechanism, and propulsion mechanism used to propel the vehicle. The vehicle further comprises a vehicle power system comprising an engine and a battery, an ignition sensor, and a power main. A wireless power-supply control assembly is also provided comprising an enclosure comprising a body and a cover, wherein the body and the cover define a hollow cavity. A wireless-receiver relay mounted to the enclosure within the hollow cavity. The wireless-receiver is adapted to wirelessly receive a command from a wireless transmitter. An ignition-sense relay is mounted to the enclosure within the hollow cavity and is coupled to the wireless-receiver relay. The ignition-sense relay is coupled to the ignition sensor and adapted to disconnect power to the wireless-receiver relay when a signal from the ignition sensor indicates that the engine is running. A latching relay is mounted to the enclosure within the hollow cavity and is coupled to the wireless-receiver relay. The latching relay has a line terminal coupled to the battery and a load terminal coupled to the power main. The latching relay has an open position and a closed position. When the latching relay is in the closed position, it is adapted to connect power from the line terminal to the load terminal. When the latching relay is in the open position, it is adapted to disconnect power from the line terminal to the load terminal. The wireless-receiver relay is adapted to cause the latching relay to switch between the open and closed positions in response to receiving a wireless command only while the engine is not running.

In another embodiment, the vehicle further comprises a manual battery switch mounted to the cover of the enclosure and connected in serial with the wireless power-supply control assembly.

Accordingly, it is an object of the present invention to provide an improved wireless solution for control of the main power supply of water vehicles. There has thus been outlined, rather broadly, certain embodiments of the invention in order that the Detailed Description thereof herein may be better understood, an in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention. Though some features of the invention may be claimed in dependency, each feature has merit when used independently.

BRIEF DESCRIPTION OF THE DRAWINGS

Further features of the present invention will become apparent to those skilled in the art to which the present invention relates from reading the following description with reference to the accompanying drawings, in which.

DETAILED DESCRIPTION

Figure 1:
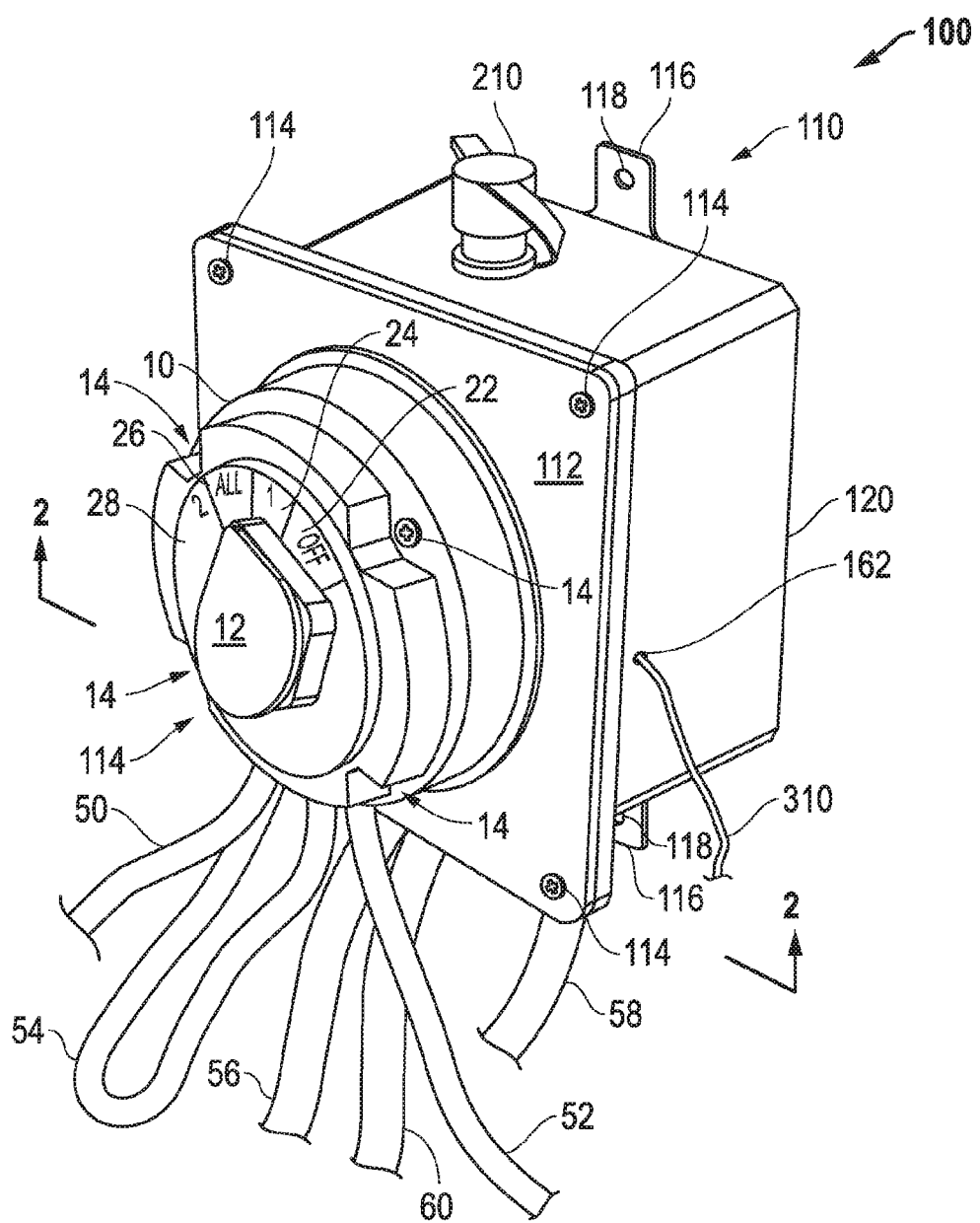
FIG. 1 is a perspective view of a wireless power-supply control assembly 100 in accordance with a preferred embodiment of the present invention exemplified being installed in serial between a conventional manual battery switch 10 and a boat's main power cable 58.

The invention will now be described with reference to the drawing figures, in which like reference numerals refer to like parts throughout. For purposes of clarity in illustrating the characteristics of the present invention, proportional relationships of the elements have not been maintained in the Figures. In some cases, the sizes of certain small components have been exaggerated for illustration.

Referring now to FIG. 1, a preferred embodiment of wireless power-supply control assembly 100 in accordance with aspects of the present invention is exemplified mounted to the interior of a ship's central console (not shown). A manual battery control switch (or battery switch) 10 is preferably mounted to a cover 112 of an enclosure 110 of the assembly 100 using fasteners 14, preferably screws, as shown. The battery switch need not be mounted directly to the assembly 100 and in other embodiments may be located remote of the assembly 100. In yet other embodiments, the assembly may operate without any battery switch as discussed below. The cover 112 is coupled to body 120 by fasteners 114, which are preferably screws. Flanges 116, for securing the body 120 to a wall of a boat, protrude from the body 120 and are adapted to receive fastener 118 (see also FIG. 2). An antenna 310 is also provided for receiving a wireless signal from a wireless transmitter (not shown) and protrudes out from the body 120 through an opening 162 to reduce interference and increase range. The present invention contemplates and advantageously allows for installing the wireless power-supply control assembly 100 between an existing battery control switch 10 an existing boat power main (or common supply cable) 58 both already located on a boat. Because the battery switch would already be wired to the boat's batteries and main power supply on a conventional boat (not shown), installation of the assembly 100 is advantageously relatively easy and efficient.

The wireless power-supply control assembly 100 comprises of an enclosure assembly 110. The enclosure assembly 110 is preferably, generally, cube or box shaped as shown and comprises a body 120 and a cover 112. In the preferred embodiment, the body 120 comprises 5 sides of a cube and the cover 112 comprises the remaining side. A hollow interior 130 (see FIG. 3) is defined by the body 120 and the cover 112. The enclosure assembly 110 is preferably a sealed weatherproof box with liquid tight strain relief fittings for all wires that penetrate the enclosure assembly 110 rendering it safe for wet locations or explosive environments. The cover 112 is also sealed to the body 120, such as by a sealant or rubberized ring, which would be held in compression by fasteners 114. However, the enclosure assembly 110 need not be waterproof provided that it is installed in a waterproof or dry area of the boat, such as the boat's existing wiring cabinet or console. In other embodiments of the present invention, the enclosure 110 is sealed, and the wireless power-supply control assembly 100 is installed in a vessel's bilge-area where explosive fuel and/or vapors may accumulate.

The battery switch 10 is exemplified as a two-battery switch that selectively supplies power from either of the boat's two batteries or both, but other switches are within the ambit of the present invention. In this embodiment, the battery switch 10 comprises a selector 12, which may be rotated between: (1) an OFF position wherein no current flows through the switch 10; (2) a ONE position 24 wherein only current from a first battery (not shown) flows through the switch 10; (3) an ALL position 26 wherein current from the first battery and a second battery (not shown) flow through the switch 10; and (4) a TWO position 28 wherein only current from the second battery flows through the switch 10.

Figure 2:
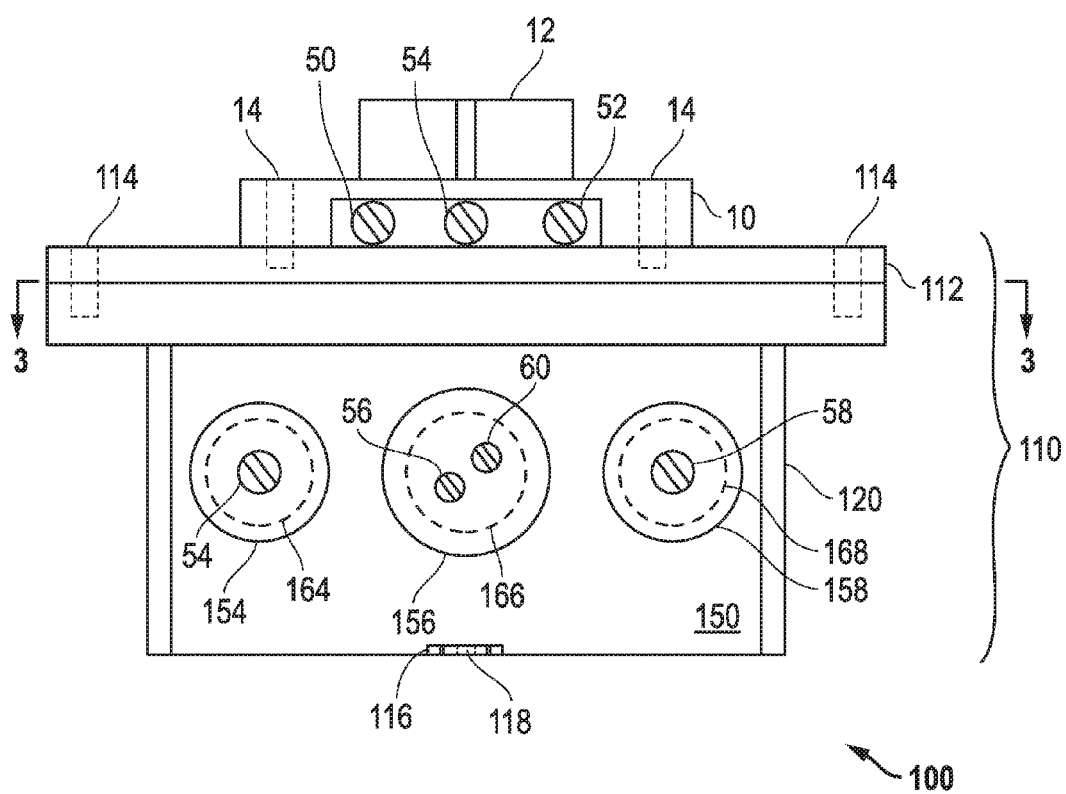
FIG. 2 is an isometric view along view 2-2 of the underside of the wireless power-supply assembly 100 and the battery switch 10 with cabling omitted for clarity.

Referring now to FIG. 2 (in addition to FIG. 1), the wiring aspects of the present invention are more clearly illustrated. A first battery cable 50 provides positive current from a first battery (not shown) and connects to a first terminal (not shown) on the battery switch 10. Second battery cable 52 provides positive current from a secondary battery (not shown) and connects to a second terminal (not shown) on the battery switch 10. Common-supply cable 54 is connected at a first end to a common supply or output terminal (not shown) of the battery switch 10 (which provides positive current from the batteries when the selector 12 is in the ONE, ALL, or TWO positions 24, 26, and 28). A second end of the common supply cable 54 is connected through a fitting 154 on a side 136 of enclosure assembly 110. A ground cable 56 is provided through a fitting 156 of the enclosure assembly 110. An ignition cable 60 is also provided through fitting 156 of the enclosure assembly 110. In the preferred embodiment, the ignition cable 60 is wired to the boat's ignition-sense line, which provides a positive current when the boat's engine is turned on. Typically, the ignition-sense line is located near the boat's battery switch. A common-supply cable 58 is connected through a fitting 158 of enclosure assembly 110. The common-supply cable 58 supplies the boat's main power. Fittings 154, 156, and 158 are preferably liquid tight strain relief fittings that permit the cables to pass through into the interior of the enclosure assembly 110, but need not be as discussed above.

In a retrofit installation (as shown in FIGS. 1-2), the wireless power-supply control assembly 100 is placed between the existing original boat battery switch 10. The existing power boat common-supply cable (or power main) 58 that would have been connected to a common supply or output lead (not shown) of the battery switch 10 is disconnected from the battery switch and connected to the wireless power-supply control assembly 100 through fitting 158 as shown in FIGS. 1-2. Common-supply cable 54 would then be connected to the common supply lead of the battery switch 10 and to the wireless power-supply assembly 100 as discussed in more detail below. Advantageously, the existing original battery switch 10 is retained in series with the wireless power-supply control assembly 100. The existing original battery switch 10 can continue to function and can combine multiple batteries or battery banks into one common-supply cable 54 that then runs into the wireless power-supply assembly 100 where the current is switched on and off by a wireless transmitter (not shown), such as a wireless key FOB. When the wireless power-supply control assembly 100 is installed with a manual battery switch, the manual battery switch must be manually set in a closed position (e.g., ONE 24, ALL 26, or TWO 28 positions) in order for the wireless power-supply control assembly 100 to wirelessly control the power supply to the boat.

In an alternative embodiment, a battery switch 10 is not necessary and may be removed. In this embodiment, the battery cables (such as 50 and 52) may be connected directly to the common-supply cable 54 or to the appropriate terminals (202, 502, and 602) within the wireless power-supply control assembly 100 as discussed below with respect to FIG. 4.

Figure 3:
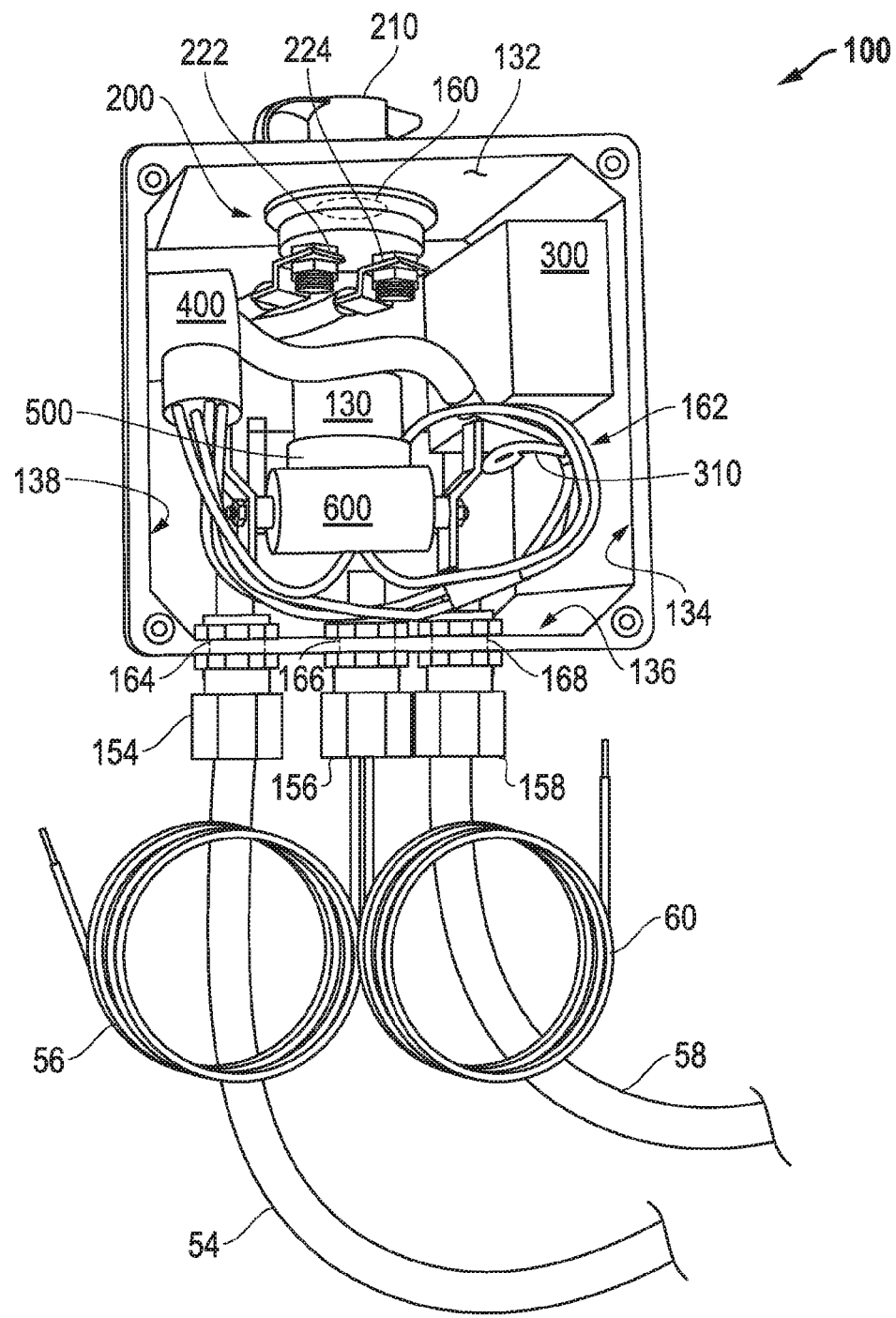
FIG. 3 is a perspective view of the wireless power-supply control assembly 100 along view 3-3 exemplified having cover 112 removed to show various internal components and wiring thereof.

Turning now to FIG. 3, a perspective view of the enclosure assembly 110 is provided exemplified having the cover 112 removed. Mounted within the hollow interior 130 are internal components of the wireless power-supply control assembly 100. A manual override switch 200 is mounted to a first side 132 of the body 120 via opening 160. The manual override switch 200 is preferably a key-operated boat-battery switch having a key port 210 exterior of the hollow interior 130 and switching-portion 220 inside the hollow interior 130. The manual override switch 200 is also preferably sealed within opening 160, such by using sealant. A wireless-receiver relay 300 is mounted, preferably by sealed fasteners, to a second side 134 of the body 120. The antenna 310 is coupled to wireless-receiver relay 300 and passes through opening 162 in side 134 (see FIG. 1). Opening 162 preferably includes a liquid tight strain relief fitting or is sealed using a sealant (not shown). Fittings 154, 156, and 158 are provided through openings 164, 166, and 168, respectively, in a third side 136 of the body 120 (shown in FIG. 2). Preferably, openings 164, 166, and 168 are sealed. An ignition-sense relay 400 is mounted to a fourth side 138 of the body 120. A fuse 500 is mounted to a fifth side 140 of the body 120, generally, centrally within the hollow interior 130. A latching relay 600 is also mounted to the fifth side of the body 120, generally, centrally within the hollow interior 130 and proximate to the fuse 400.

Figure 4:
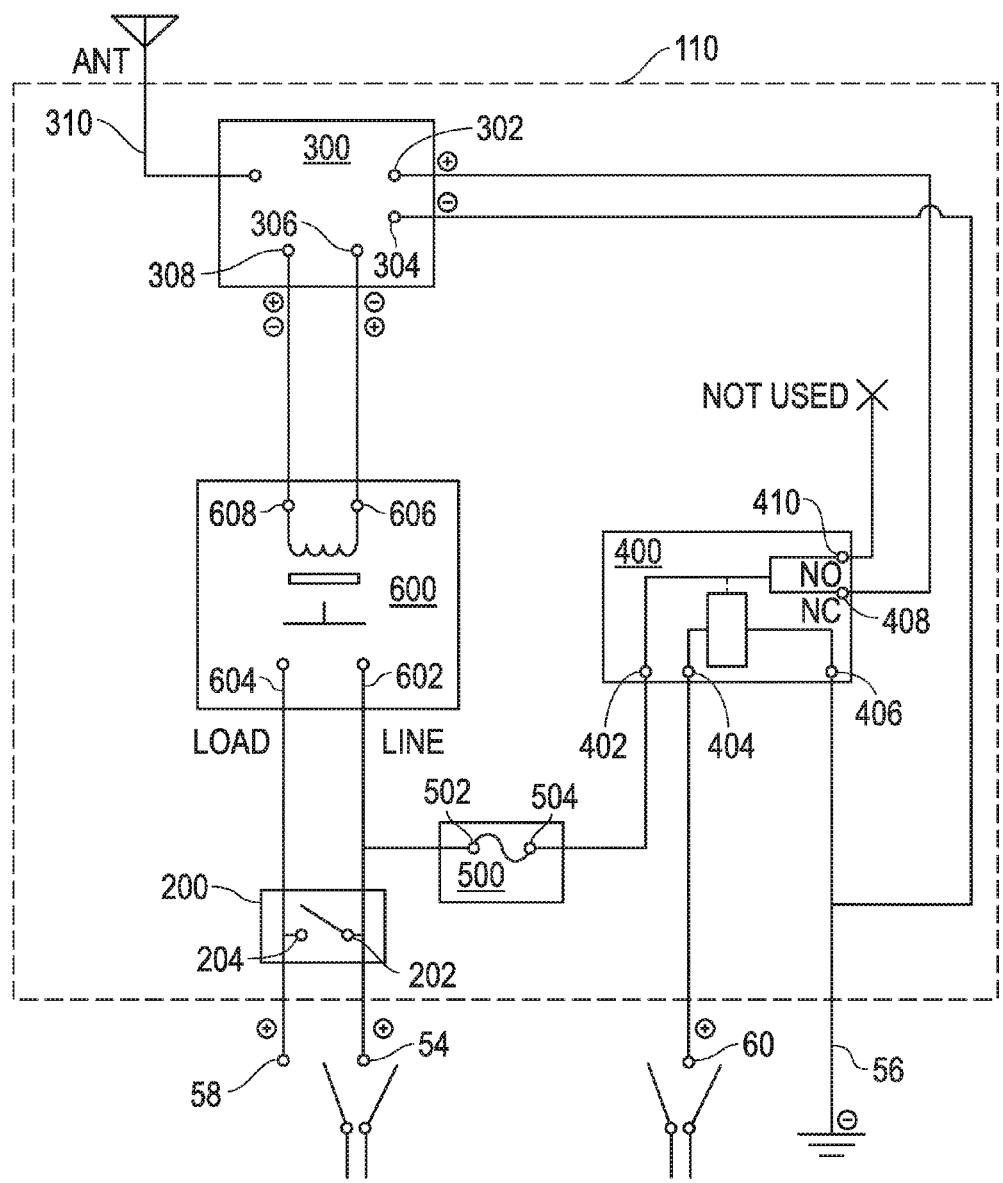
FIG. 4 is a schematic diagram of the wireless power-supply control assembly 100.

Referring now to FIG. 4, a wiring schematic diagram of the wireless power-supply control assembly 100 is provided. Common-supply cable 54, which is preferably a positive size 0 battery cable, from the battery switch 10 (shown in FIG. 1) connects to a line terminal 602 of the latching relay 600. The fuse 500 comprises as a first terminal 502 and a second terminal 504. The fuse 500 is preferably a 3 ampere fuse and wired in a closed configuration. The first terminal 502 is also coupled to the common-supply-in cable 54, and the second terminal 504 is coupled to a line terminal 402 of the ignition-sense relay 400. Ignition-sense cable 60 is coupled to an ignition-sense terminal 404 of the ignition-sense relay 400. Ground cable 56 is coupled to a ground terminal 406 of the ignition-sense relay 400. A load terminal 408 of the ignition-sense relay 400 is coupled to a line terminal 302 of the wireless-receiver relay 300. A ground terminal 304 of the wireless power-supply relay 300 is coupled to the ground cable 56. The antenna 310, which is preferably a flexible wire-style antenna, extends from the main body portion of the wireless power-supply control relay 300 to the outside of the enclosure 110. Control terminals 306 and 308 of the wireless power-supply control relay 300 are coupled to control terminals 606 and 608 of the latching relay 600, respectively. A load terminal 604 of the latching relay 600 is coupled to the common-supply-out cable 58. Terminals 202 and 204 of the manual override switch 200 are coupled to the common-supply cable 54 and the common-supply cable 58, respectively.

The operation of the wireless power-supply control assembly 100 is now discussed with reference FIGS. 1-4. As discussed above, the manual battery switch 10 (if used) will be manually set to the closed position (e.g., ONE 24, ALL 26, or TWO 28), thus energizing common-supply cable 54 and providing power to the wireless power-supply assembly 100.

The ignition-sense relay 400 provides for an ignition sense feature for preventing accidental power disconnect of the boat's power supply while the engine is running. The ignition-sense relay 400 has a closed and an open mode. In the preferred embodiment, when the boat's engine is turned off, such when the boat is docked, the ignition-sense cable 60 is not energized and a coil within the ignition-sense relay 400 is in its normal closed position. In the closed position, power is passed from line terminal 402 (which is energized by the common-supply cable 54 via the fuse 500) to load terminal 408 then to the wireless-receiver relay 300. When the boat's engine is running, the ignition-sense cable 60 is energized, which cause the coil of the ignition-sense relay 400 to be in an open position and thereby disconnects power to the wireless-receiver 300. With no current flowing to the wireless-receiver relay 300, the wireless-receiver relay 300 is disabled, disallowing control of the wireless-receiver relay 300 by the wireless transmitter and preventing accidental disconnection of the boat's power supply when the engine is running.

In the preferred embodiment, the wireless-receiver relay 300 comprises a polarity reversing momentary 12V DC circuit that feeds the latching relay 600. When the wireless-receiver relay 300 receives via antenna 310 a wireless signal or command from a wireless transmitter, the wireless-receiver relay 300 reverses the polarity of terminals 306 and 308 and thus the control terminals 606 and 608 of the latching relay 600. The wireless transmitter may send an on or off command, or merely send a single command, and reverse polarity accordingly.

The latching relay 600 moves between open and closed positions when the polarity supplied by the wireless-receiver relay 300 to control terminals 606 and 608 reverses. When the latching relay 600 is in a closed position, power from the line terminal 602 is connected to the load terminal 604 and the boat is powered. When the latching relay 600 is in an open position, power from the line terminal 602 is disconnected from the load terminal 604 and the boat's power is disconnected. The latching relay 600 maintains its current open or closed position regardless of whether any current is applied to terminals 606 and 608 by the wireless-receiver relay 300. Thus, when the wireless-receiver relay 300 is without power because the ignition-sense relay 400 is in the open position (i.e., when the engine is running), the latching relay 600 may remain in the closed position and power the boat.

In the event of a failure of any part of the wireless power-supply control assembly 100 (e.g., the fuse 500 blows), the manual over-ride switch 200 may be used to manually bypass components 300, 400, 500, and 600. The manual over-ride switch 200 may be in open or closed position. In the open position, the wireless power-supply control 100 functions normally and controls the boat's power. However, in the closed position, power will flow through the manual override switch 200 directly from the common-supply 54 to the common-supply 58, thus bypassing component 300, 400, 500, and 600. In the preferred embodiment, the manual override switch 200 may be manually set to open or closed positions using a special key that is inserted into key port 210.

When the boat's existing battery disconnect switch 10 is in the OFF position 22 all current to the wireless power-supply control assembly 100 is also disconnected rendering the assembly 100 non-functional. When the boat's existing battery switch 10 is in the ALL 26, ONE 24, or TWO 28 positions the wireless power-supply control assembly 100 is energized and may "listen" for a wireless command from the wireless transmitter (assuming the ignition of the boat is not on). In accordance with another embodiment of the present invention, in listen mode the wireless power-supply control assembly 100 consumes approximately 10 nano amperes or less of current. Furthermore, in accordance with yet another embodiment of the present invention, when the wireless-receiver relay 300 switches polarity on terminals 306 and 308, the wireless-receiver relay 300 consumes approximately 0.3 amperes or less of current. No current is required to maintain the latching relay 600 in either the open or closed position.

As previously explained, the wireless-receiver relay 300 will not work once the ignition has started. Once the ignition has started, the ignition-sense relay 400 opens and interrupts current from flowing to the wireless-receiver relay 300. This prevents the wireless-receiver relay 300 from causing the latching relay 600 to change positions when the vessel's ignition is on and the wireless transmitter is inadvertently activated. Advantageously aspects of the present invention avoid undesired opening of the latching relay 600 that result in total loss of all electrical power to the vessel and result in unexpected loss of propulsion, electronic navigation, radio communication, lighting and other critical functions of a vessel underway at sea.

In accordance with an alternate embodiment of the present invention, multiple latching relays are used to control separate battery banks. In this embodiment, a wireless transmitter with multiple channels is provided and each channel is used to individually control a latching relay.

The many features and advantages of the invention are apparent from the detailed specification, and thus, it is intended by the appended claim to cover all such features and advantages of the invention which fall within the spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. A wireless power-supply control assembly comprising:
   an enclosure comprising a body and a cover, wherein the body and the cover define a hollow cavity;
   a wireless-receiver relay mounted to the enclosure within the hollow cavity, the wireless-receiver being adapted to wirelessly receive a command from a wireless transmitter; and
   a latching relay mounted to the enclosure within the hollow cavity and coupled to the wireless-receiver relay, the latching relay having a line terminal adapted to be coupled to a common-supply cable from a boat's battery and a load terminal adapted to be coupled to a boat's power main cable, the latching relay having an open position and a closed position, wherein the latching relay is adapted to connect power from the line terminal to the load terminal when the latching relay is in the closed position and to disconnect power between the line terminal and the load terminal when the latching relay is in the open position;
   wherein the wireless-receiver relay is adapted to cause the latching relay to switch between the open and closed positions in response to receiving a wireless command.

2. The wireless power-supply control assembly of claim 1 further comprising:
   an ignition-sense relay mounted to the enclosure within the hollow cavity and coupled to the wireless-receiver relay, wherein the ignition-sense relay is adapted to receive a boat's ignition-sense signal and adapted to disconnect power to the wireless-receiver relay when the ignition-sense signal indicates that a boat's engine is running.

3. The wireless power-supply control assembly of claim 1 further comprising:
   an antenna coupled to the wireless-receiver relay, wherein at least a portion of the antenna extends through an opening in the enclosure to the exterior of the enclosure.

4. The wireless power-supply control assembly of claim 3, wherein the opening for the antenna is sealed.

5. The wireless power-supply control assembly of claim 1 further comprising:
   a manual override switch mounted to the enclosure and having an open and a closed position, wherein the manual override switch is adapted to bypass the latching relay when in a closed position.

6. The wireless power-supply control assembly of claim 5, wherein the manual override switch is mounted in an opening in the enclosure and the manual override switch is adapted to be selectably positioned in the open or the closed position from the exterior of the enclosure.

7. The wireless power-supply control assembly of claim 1, wherein the latching relay is adapted to remain in its current open or closed position if power is disconnected to the wireless-receiver relay.

8. The wireless power-supply control assembly of claim 1, wherein the latching relay is adapted to remain in its current open or closed position without using any power.

9. The wireless power-supply control assembly of claim 1, wherein the latching relay is a high-current magnetic latching relay.

10. The wireless power-supply control assembly of claim 1, wherein the wireless-receiver relay is adapted to consume approximately 10 nano amperes or less of current while listening for a wireless command.

11. The wireless power-supply control assembly of claim 1, wherein the wireless-receiver relay is a polarity switching circuit and is adapted to consume approximately 0.3 amperes or less of current while switching polarity.

12. The wireless power-supply control assembly of claim 1 further comprising at least one liquid tight strain relief fitting mounted in an opening in the enclosure and adapted for receiving a common-supply cable.

13. The wireless power-supply control assembly of claim 1, wherein the hollow interior is adapted to be substantially waterproof when the enclosure is operational.

14. The wireless power-supply control assembly of claim 1, wherein the enclosure is substantially box shaped.

15. A water vehicle comprising:
   a hull, gunnel, steering mechanism, and propulsion mechanism used to propel the vehicle;
   a vehicle power system comprising an engine and a battery, an ignition sensor, and a power main; and
   a wireless power-supply control assembly comprising:
      an enclosure comprising a body and a cover, wherein the body and the cover define a hollow cavity;
      a wireless-receiver relay mounted to the enclosure within the hollow cavity, the wireless-receiver adapted to wirelessly receive a command from a wireless transmitter;
      an ignition-sense relay mounted to the enclosure within the hollow cavity and coupled to the wireless-receiver relay, wherein the ignition-sense relay is coupled to the ignition sensor and adapted to disconnect power to the wireless-receiver relay when a signal from the ignition sensor is indicative that the engine is running; and
      a latching relay mounted to the enclosure within the hollow cavity and coupled to the wireless-receiver relay, the latching relay having a line terminal coupled to the battery and a load terminal coupled to the power main, the latching relay having an open and a closed positions, wherein the latching relay is adapted to connect power from the line terminal to the load terminal when the latching relay is in the closed position and disconnect power from the line terminal to the load terminal when the latching relay is in the open position;
      wherein the wireless-receiver relay is adapted to cause the latching relay to switch between the open and closed positions in response to receiving a wireless command only while the engine is not running.

16. The water vehicle of claim 15 further comprising a manual battery switch mounted to the cover of the enclosure and connected in serial with the wireless power-supply control assembly.

* * * * *